Oct. 13, 1970  F. QUEIROLO ET AL  3,534,319
POWERPOLE
Filed Feb. 6, 1969  4 Sheets-Sheet 1
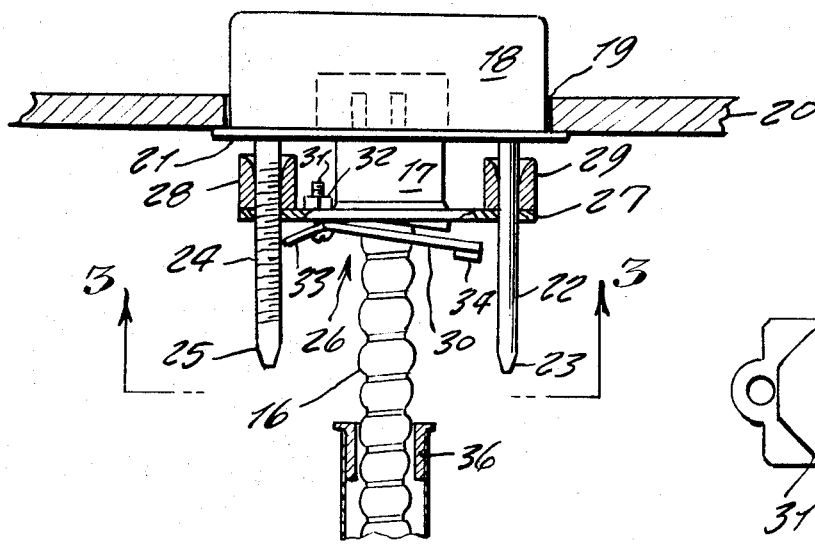
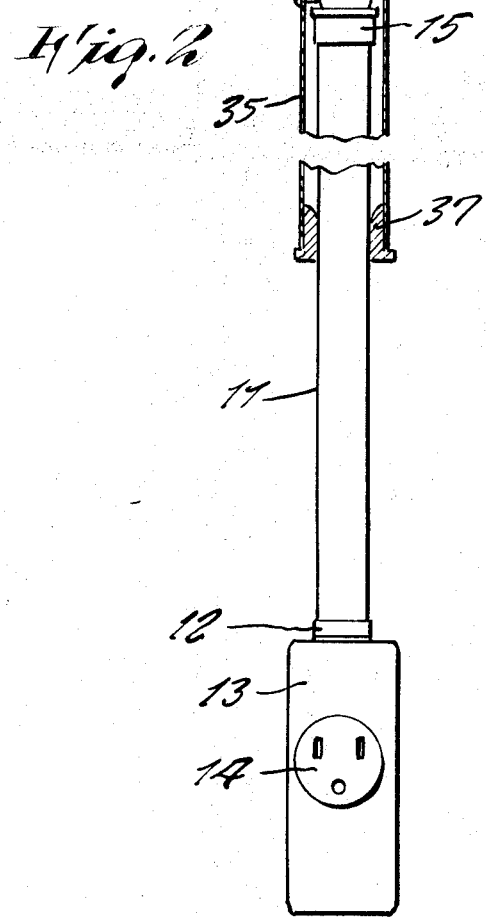
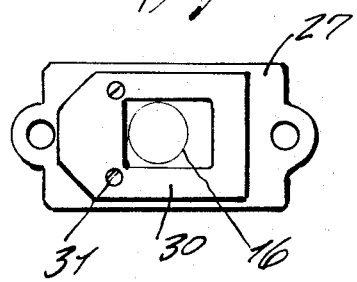
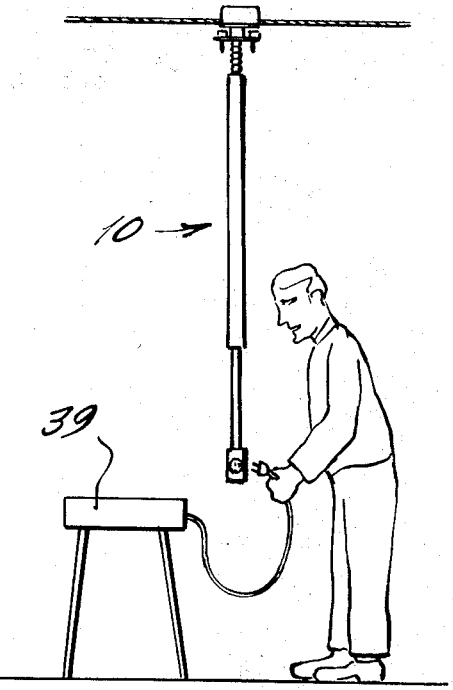
INVENTORS
FRANCIS QUEIROLO
AND
WINSTON C. WATSON Oct. 13, 1970   F. QUEIROLO ET AL   3,534,319
POWERPOLE
Filed Feb. 6, 1969   4 Sheets-Sheet 2
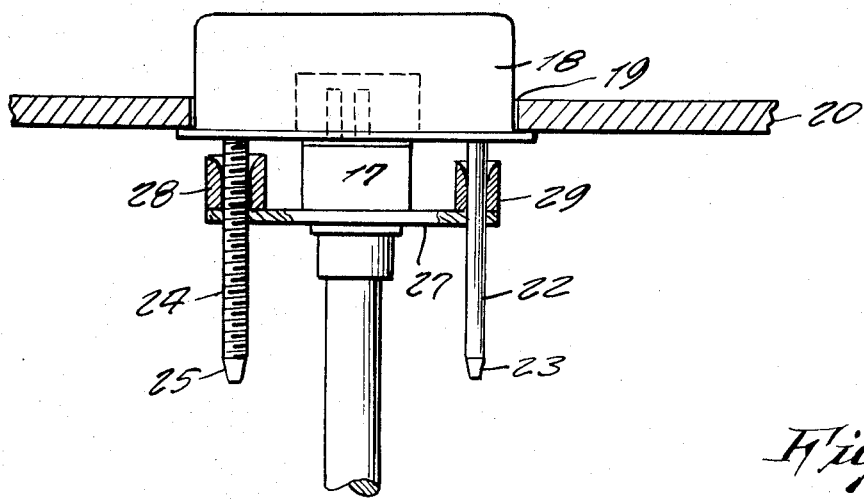
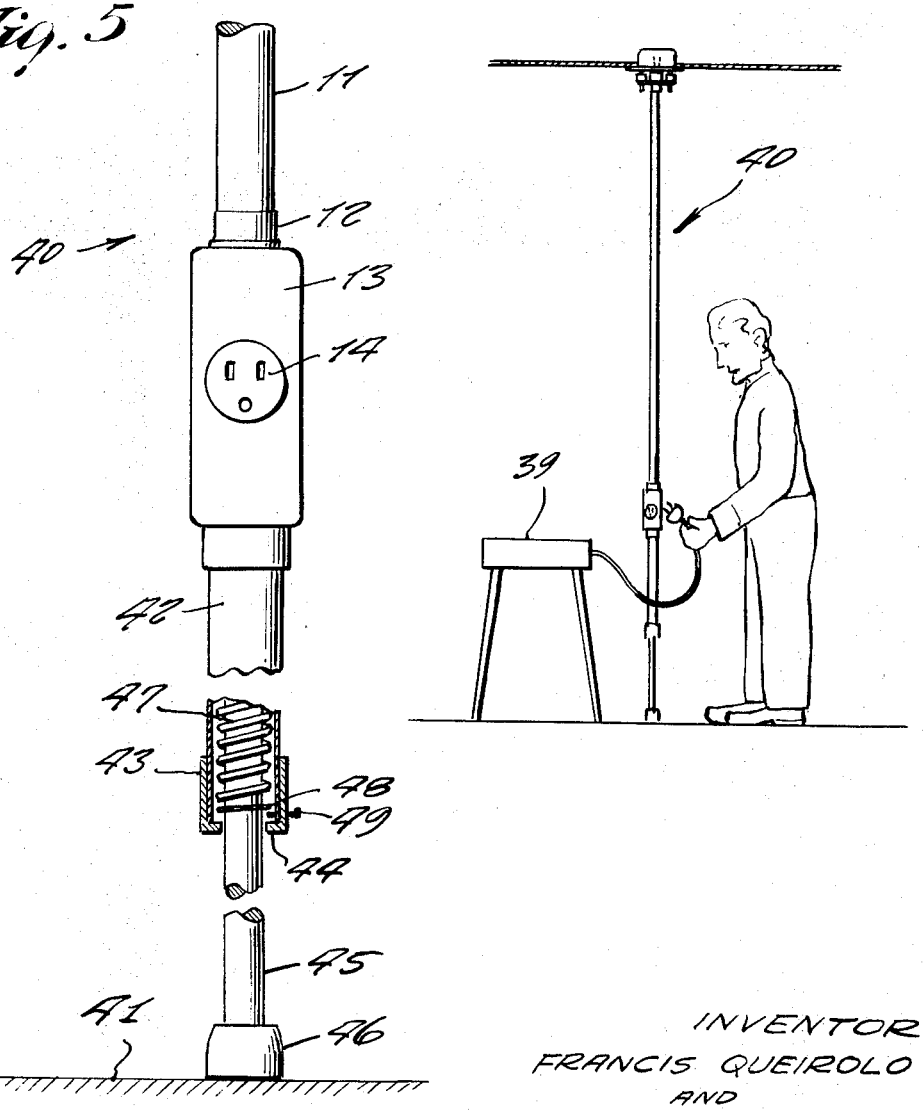
INVENTORS
FRANCIS QUEIROLO
AND
WINSTON C. WATSON

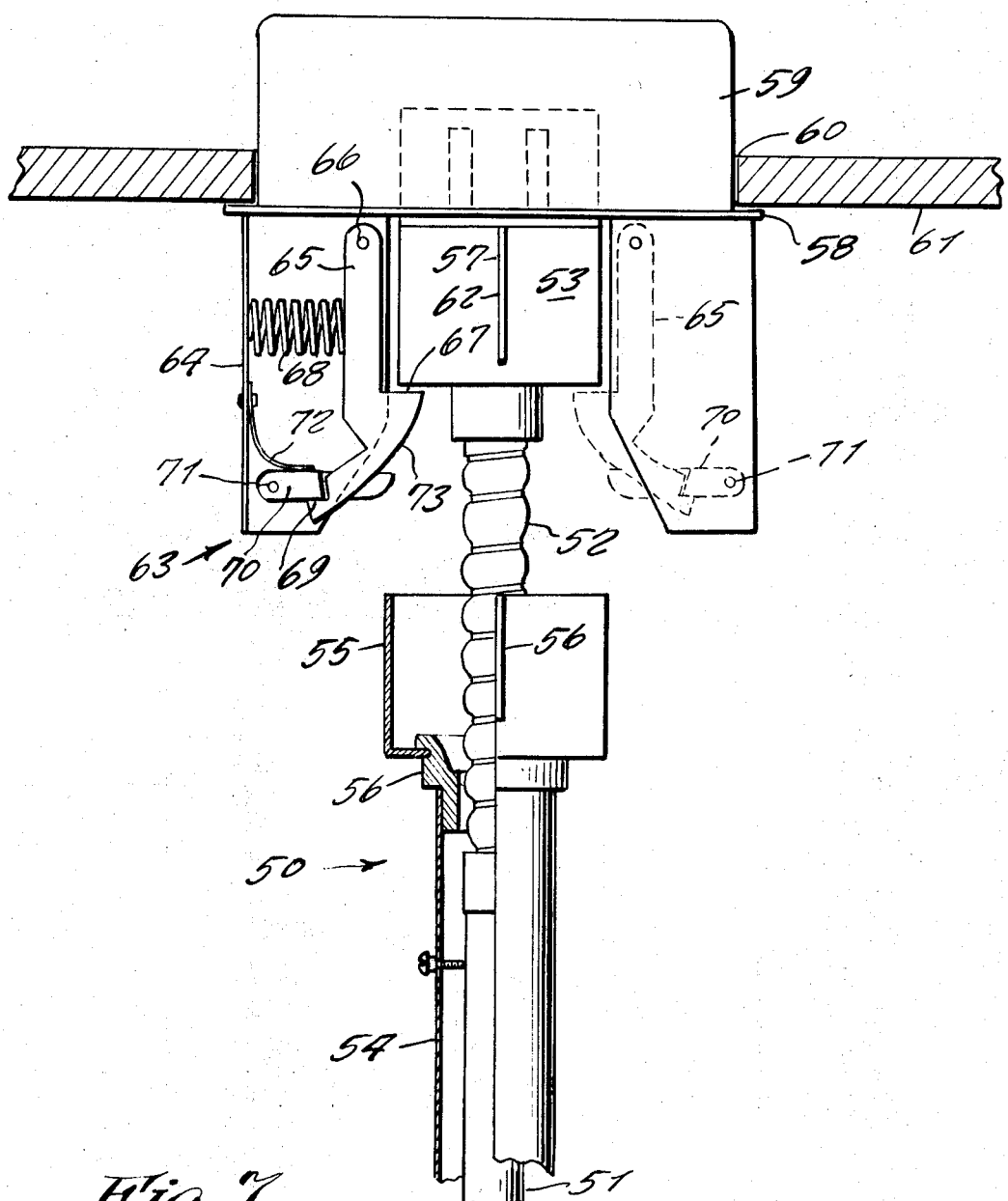
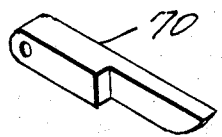

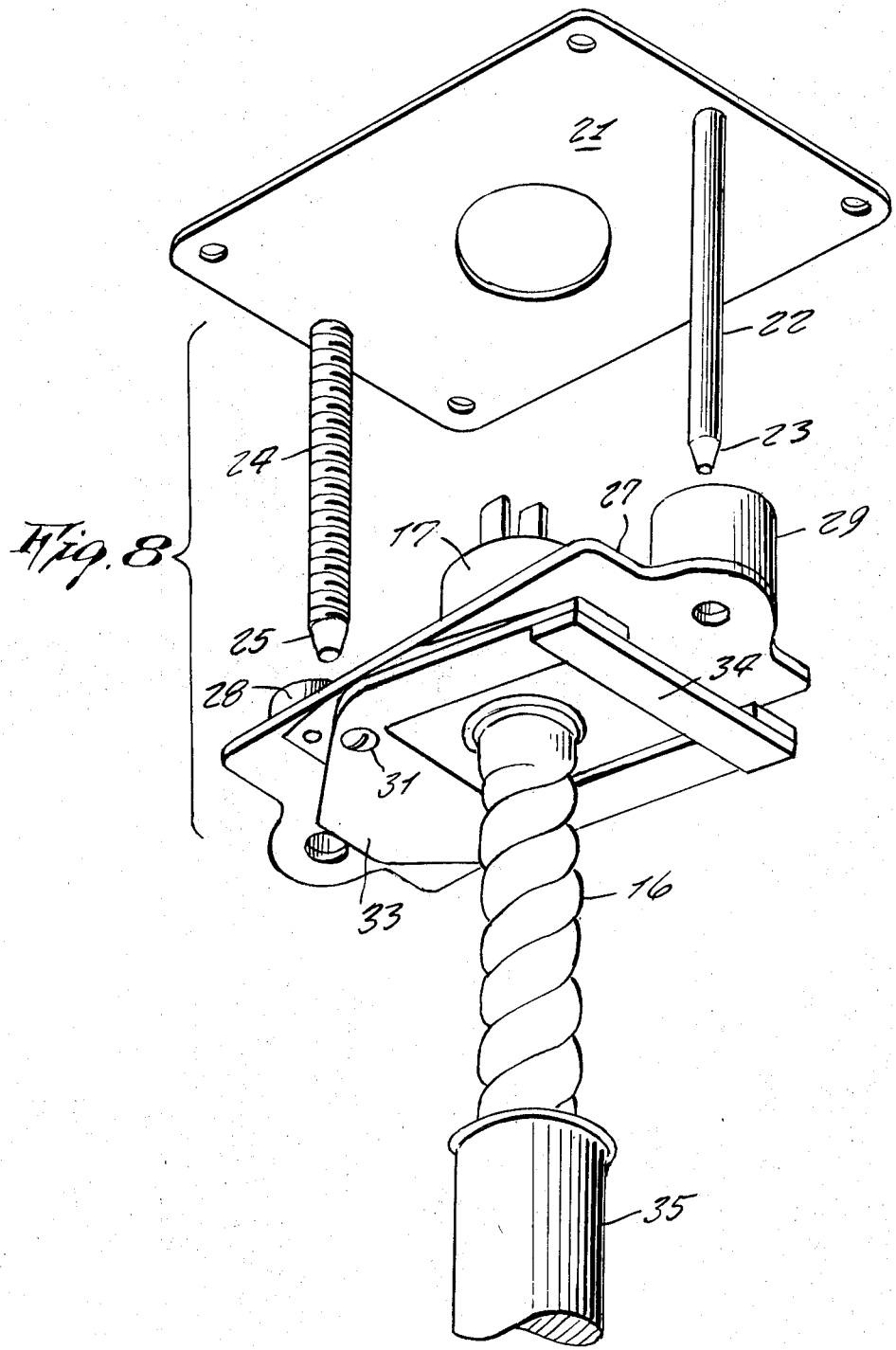

United States Patent Office 3,534,319
Patented Oct. 13, 1970

3,534,319
POWERPOLE
Francis Queirolo, 800 W. Longview, Stockton, Calif. 95207, and Winston C. Watson, Stockton, Calif. (14263 N. Locust Tree Road, Lodi, Calif. 95240)
Filed Feb. 6, 1969, Ser. No. 797,100
Int. Cl. H01r 13/60, 13/62, 13/64
U.S. Cl. 339—24
4 Claims

ABSTRACT OF THE DISCLOSURE

A device for distributing electrical and communications outlets at or near electrical equipment height, the device comprising a vertical pole, the upper end of it being removeably connectable selectively to an electric outlet box in a ceiling, and the lower portion of the pole being provided with electric outlet sockets to which various electrical equipment may be connected.

---

This invention relates generally to electrical outlet equipment.

A principal object of the present invention is to provide a device for conveniently distributing electrical and communication outlets at an elevation which is convenient to the location of electrical appliances and the like.

Another object of the present invention is to provide a device comprising a power pole which at its upper end is engageable within an electrical outlet in a ceiling, and a lower portion thereof having electrical outlet sockets into which various electrical appliances may be plugged.

Yet another object of the present invention is to provide a power pole which can be readily attached and detached from one outlet box in a ceiling so that the power pole may be conveniently moved to another outlet box.

Yet a further object of the present invention is to provide a power pole that is installed in a non-reversible alignment with the ceiling outlet box.

Other objects of the present invention are to provide a power pole which is simple in design, inexpensive to manufacture, rugged in construction, easy to use and efficient in operation.

These and other objects will be readily evident upon a study of the following specification and the accompanying drawings wherein:

FIG. 1 is a side elevation view of one form of the present invention, shown in operative use, FIG. 2 is an enlarged detail view thereof shown partly in cross section, FIG. 3 is a bottom view in the direction 3—3 of FIG. 2, FIG. 4 is a view similar to FIG. 1 and shownig a modified form of the present invention, FIG. 5 is an enlarged detail view thereof shown partly in cross section, FIG. 6 is an enlarged side elevation view shown partly in cross section and illustrating a modified form of latch assembly, FIG. 7 is a perspective view of a part used in the structure illustrated in FIG. 6, and FIG. 8 is a bottom perspective view of the latch assembly illustrated in FIG. 2.

Referring now to the drawings in detail, and more particularly to FIGS. 1, 2, 3 and 8, the reference numeral 10 represents a power pole, according to the present invention, wherein there is a thin wall pipe or conduit 11 having a connector 12 at its lower end which is engaged to an outlet box 13 provided with one or several outlet sockets 14. The upper end of the pipe or conduit 11 is provided with a connector 15 for connection to a standard flexible conduit 16 extending upwardly therefrom. The connector 15 may include a Jake nut with pipe thread to a coupling. The upper end of the standard flexible conduit 16 engages an electrical or communications connector, or cannon plugs 17 adjacent a standard electrical outlet box 18 mounted within an opening 19 formed in a ceiling 20.

A cover plate 21 is mounted on the underside of the outlet box 18, the cover plate having a vertically, downwardly extending pin 22 rigidly affixed thereto by a weld or the like, the lower end of the pin 22 being conically tapered, as shown at 23. A case hardened bolt 24 is provided with a screw thread along the full length thereof, the lower end thereof being likewise conically tapered, as shown at 25. The bolt is likewise rigidly affixed by means of a weld or the like to the underside of the cover plate 21.

A latch assembly 26 is mounted at the upper end of the standard flexible conduit immediately below the cannon plugs 17 of the power pole. The latch assembly 26 includes a horizontal plate 27 upon the upper side of which there are secured a pair of upstanding steel sleeves 28 and 29, each having a central opening therethrough and through the plate 27 for the purpose of slideably engaging the pin 22 and the bolt 24. It will be readily apparent that the central openings of the sleeves will each be of a specific diameter so to receive either the pin or bolt only, thereby providing a non-reversible alignment of the power pole with the outlet box 18.

As is shown in FIG. 2, it will be readily evident that the bolt 24 is of a relatively larger diameter than the pin, accordingly not permitting a reverse position connection of the power pole to the outlet box. A latch-type plate 30 is secured pivotly loose to the underside of the plate 27 by means of a pair of bolts 31 secured by nuts 32, so as to allow a limited pivotal movement of the latch-type plate 30 respective to the plate 27. The latch-type plate 30 includes a downwardly bent tow 33 one end thereof which serves as a wedge for jamming against the thread of the bolt 24, as shown in FIG. 2 of the drawing. The opposite end of the latch-type plate 30 is provided with a weight 34 so as to normally urge the tow 33 to remain in a wedged position with the threaded bolt.

An elongated sleeve 35 is mounted slideably free around the outer side of the thin wall conduit, the upper and lower ends of the sleeve 35 being provided with internal bushings 36 and 37 for sliding along the conduit 11 and the flexible conduit 16. A pin or set screw 38 fitted through the sleeve 35 may be provided for engaging the connector 15 and thus serve to hold the sleeve in an elevated position. Thus the sleeve 35 is slideable vertically only in an upwardly direction and not downwardly therefrom.

In operative use, the present power pole may be efficiently employed in a loft-type building, such as a school, office building, factory, a ship, or the like, and wherein there may be provided a plurality of standard outlet boxes 18 at various places along the ceiling 20. In order to provide electrical power to an appliance or other electrical equipment 39, located a relatively far distance below the ceiling, the upper end of the power pole is secured to the outlet box by first inserting the sleeves 28 and 29 on the bolt and pin, respectively, thereby assuring a proper alignment. Upon further upward movement of the power pole, the cannon plugs 17 will engage the outlet box 18, thus providing electrical connection from the outlet box 18 to the outlet box 13 at the lower end of the power pole. It will be noted that as the power pole is pushed upwardly for effecting the electrical engagement that the tow 33 of the latch-type plate engages the threads of the bolt in the manner of a pall and ratchet due to the weight 34 at the other end of the latch-type plate normally causing the tow to remain in contact engagement with the bolt.

Upon release of the power pole, the tow 33 engaging the thread of the bolt will thus maintain the power pole in a vertically supported position therefrom. When it is desired to disconnect the power pole from the ceiling outlet box and move to another ceiling outlet box, the operator simply slides the sleeve 35 upwardly so that the upper end thereof engages the latch-type plate 30 causing it to pivot around the bolts 31 and thus cause the tow 33 to disengage with the threads of the bolt 24. While holding the sleeve 35 against the latch-type plate 30, the conduit 11 grasped in the operator's other hand is then moved downwardly thus causing disengagement of the cannon plugs from the outlet box and thus disengaging the power pole fully from the ceiling unit. It is to be noted that the purpose of the flexible conduit 16 serves to prevent any damage to the ceiling installation and the latching assembly in case of a sideward leverage force against the lower end of the power pole.

In a modified form of the present invention, shown in FIGS. 4 and 5 of the drawing, the power pole 40 is shown to comprise a unit having a lower end which rests against a floor 41, and which accordingly does not require the above described assembly 26. The power pole 40 accordingly includes the thin wall conduit 11, the connector 12 at its lower end connected to outlet box 13 having outlet socket receptacles 14, the upper end of the thin wall conduit 11 carrying the plate 27 with sleeves 28 and 29 for fitting over bolt 24 and pin 22, respectively, and the power pole carrying the cannon plugs 17 for engaging the ceiling outlet box 18. It will be further noted that the conduit 11 extends the full distance between the outlet box 13 and the cannon plugs without the flexible conduit 16 therebetween.

In the present construction, a rigid conduit 42 is secured to the underside of the outlet box 13, the rigid conduit having a ferrule at the lower end thereof provided with inwardly extending flange 44 at the lower end thereof. A pipe leg 45 extends upwardly into the lower end of the rigid conduit, the lower end of the pipe having a foot 46 for placement against the floor 41, there being provided a compression coil spring 47 within the rigid conduit and around the pipe leg for normally urging the leg downwardly against the floor. A keeper 48 is provided between the lower end of the spring 47 and the flange 44. A set screw 49 serves to limit the height of the pole.

In a further modified construction, shown in FIGS. 6 and 7, the power pole 50 is shown to include a rigid conduit 51 having a flexible conduit 52 at the upper end thereof having a connector 53 thereupon. A slideable sleeve 54 on the conduit 51 carries a cup 55 at the upper end thereof secured by means of a bushing 56 to the sleeve 54. The cup 55 has a slot 56, for engagement with a fin 57 secured to the underside of a cover plate 58 of the electric outlet box 59 mounted within opening 60 of the ceiling 61. The connecter 53 is likewise provided with a slot 62 for engagement with fin 57 thus providing a non-reversible alignment of the power pole with the electric outlet box 59. A latch assembly 63 is secured to the cover plate 58, comprises a frame 64 which serves as a housing around a mechanism that includes a pair of catches 65 pivotable at their upper ends around pivot pins 66, the lower ends of the catches being provided with hooks 67 for engaging against the underside of the connecter 53. A compression coil spring 68 bearing at one end against the frame 64 and at the other end against the catch 65, normally urges the hook 67 into engaging position for supporting and securing a connecter 53 to the ceiling outlet box. Each catch 65 further includes a hook 69 for engaging a lock pin 70 pivotable about a pivot pin 71 secured to the frame 64, the lock pin 70 being normally urged into engaging position with the hook 69 by a leaf spring 72. Thus the lock pin normally prevents any force accidently from moving the catches 65 sidewardly and thus allowing the power pole to disengage with the ceiling outlet box. However, to disengage the power pull, the sleeve 54 is pushed upwardly until the slot 56 is engaged with the fin 57, the cup 55 during its upward travel, normally pivoting the lock pins 70 upwardly thus disengaging with the hooks 69 of the catches 65 and at the same time, the cup 55 at its upper edge engaging the arcuate surface 73 of each catch 65 and thus normally urging the catches to pivot outwardly away against the force of the compression coil springs 68 so that the hooks 67 clear the connecter 53 of the power pole. Thus the power pole can be disengaged.

It will of course be understood that the power pole shown in FIGS. 4 and 5 of the drawing will be used preferrably within buildings where the outlets in the ceiling are at a constant height and a rigid pole would accordingly be desirable.

What we now claim is:

1. In a power pole, the combination of a vertical conduit of rigid type, said conduit having means for being removably connected at its upper end to an electric outlet box mounted within a ceiling, said conduit having along a lower part thereof an outlet box with outlet receptacle socket means for engagement with electrical appliances at a convenient elevation thereto, the upper end of said conduit being connected to the lower end of a flexible conduit, the upper end of said flexible conduit being connected to a connector electrically engageable with said ceiling outlet box, and latch means for removable securement of the upper end of said power pole to said ceiling connection box.

2. The combination as set forth in claim 1, wherein said removable connection means comprises a latch assembly secured to the upper end of said power pole, said latch assembly comprising a horizontal plate secured to the upper end of said flexible conduit, said horizontal plate supporting a pair of upwardly extending sleeves, each of which has a central opening of a different diameter, a latch-type plate secured pivotly free to the underside of said horizontal plate, one end of said latch-type plate having an angularly disposed tow and the opposite end of said latch-type plate having a weight, and said ceiling conduit box having a cover plate on the underside thereof from which there extends downwardly a pin receivable within one of said sleeves and a threaded bolt receivable within the other of said threaded sleeves, said tow of said latch-type plate normally engaging the threads of said bolt for latching securement of said power pole to said ceiling outlet box.

3. The combination as set forth in claim 2, wherein a slideable sleeve is carried around said conduits of said power pole, the upper end of said sleeve being engageable against the underside of said latch-type plate for pivotal movement thereof and disengagement of said tow with said threads of said bolt, and said sleeve of said power pole including a set screw extending therethrough for limiting the downward vertical travel of said sleeve along said power pole conduit.

4. The combination as set forth in claim 1, wherein said ceiling outlet box is provided with a cover plate on the underside thereof, a frame secured to said cover plate, said frame enclosing a latch assembly comprised of a plurality of catches pivotable about their upper ends about pivot pins, each of said catches having a hook along a lower portion thereof, said hook engaging a cup-shaped connector at the upper end of said power pole, said cup having a slot therein engaging a fin secured to said cover plate, each of said catches being normally urged for engagement with said cup by a compression coil spring between said catch and said frame, a lock pin normally urged by a leaf spring to engage a second hook on each of said catches so to maintain said catch in a locked engaging position respected to said cup on the upper end of said power pole, and said power pole having a vertically slideable sleeve thereupon, the upper end of said sleeve being provided with a cup receivable around the cup of said power pole, said sleeve cup having a slot for engaging with said fin of said cover plate, and the upper edge of said cup of said sleeve being engageable with an arcuate surface of each said catch and the end of said lock pin for normally disengaging said lock pin with said second hook so to allow outward pivotal movement of said catch against the action of said compression coil spring and thus disengage said catch with said cup of said power pole.

References Cited

UNITED STATES PATENTS

| | | | |
|---|---|---|---|
| 2,858,381 | 10/1958 | Goldberg et al. | 240—52 X |
| 2,965,751 | 12/1960 | Stiffel | 339—22 X |
| 3,187,294 | 6/1965 | Murray et al. | 174—58 X |

MARVIN A. CHAMPION, Primary Examiner

T. P. LEWIS, Assistant Examiner

U.S. Cl. X.R.

339—28, 66, 91, 110, 119